US012689442B2

(12) United States Patent
Mainardi et al.

(10) Patent No.: US 12,689,442 B2
(45) Date of Patent: Jul. 21, 2026

(54) ELECTRONIC MODULE, ESPECIALLY OPTICAL TRANSCEIVER MODULE

(71) Applicant: Adtran Networks SE, Meiningen (DE)

(72) Inventors: Richard Mainardi, Hudson (CA); Ross Saunders, Ottawa (CA)

(73) Assignee: Adtran Networks SE, Meiningen (DE)

( * ) Notice: Subject to any disclaimer, the term of this patent is extended or adjusted under 35 U.S.C. 154(b) by 254 days.

(21) Appl. No.: 18/378,749

(22) Filed: Oct. 11, 2023

(65) Prior Publication Data

US 2024/0137125 A1     Apr. 25, 2024
US 2024/0235686 A9     Jul. 11, 2024

(30) Foreign Application Priority Data

Oct. 19, 2022     (EP) ..................................... 22202434

(51) Int. Cl.
*H04B 10/43*          (2013.01)
*H04B 1/036*          (2006.01)

(52) U.S. Cl.
CPC ............. *H04B 10/43* (2013.01); *H04B 1/036* (2013.01)

(58) Field of Classification Search
CPC ...... H04B 10/43; H04B 1/036; G02B 6/4246; G02B 6/4269; G02B 6/428; G02B 6/4293; G02B 6/4268; H01L 23/367; H01L 23/4006; H01L 23/42
See application file for complete search history.

(56) References Cited

U.S. PATENT DOCUMENTS

| | | | | |
|---|---|---|---|---|
| 7,295,441 | B1 * | 11/2007 | Laio ...................... | H05K 1/0206 |
| | | | | 257/713 |
| 7,806,574 | B2 * | 10/2010 | Van Laanen .......... | F21V 29/763 |
| | | | | 362/345 |
| 9,924,615 | B2 * | 3/2018 | Bucher ................ | G02B 6/4277 |
| 11,112,572 | B2 * | 9/2021 | Tittenhofer .......... | H05K 7/1491 |

(Continued)

FOREIGN PATENT DOCUMENTS

| | | |
|---|---|---|
| CN | 112397465 A | 2/2021 |
| EP | 3121630 A1 | 1/2017 |
| JP | 4285738 B2 * | 6/2009 |

OTHER PUBLICATIONS

Tanaka Yoshito, "Heat Radiation Structure of Electronic Equipment", Jun. 24, 2009, Yamatake Corp, Entire Document (Translation of JP 4285738). (Year: 2009).*

*Primary Examiner* — Stephen S Sul
(74) *Attorney, Agent, or Firm* — The Webb Law Firm

(57)          ABSTRACT

The invention relates to an electronic module, especially an optical transceiver module, including a casing, at least a portion of which consists of a thermally conductive material adapted to dissipate heat to the surrounding air or to a neighboring heat sink (heat dissipating portion); and a printed circuit board provided within the casing, the printed circuit board carrying at least one heat producing electronic device on a mounting surface thereof. A table-like heat dissipating element having one or more legs extending from a table top is provided on the mounting surface. The table top covers the at least one heat producing electronic device and the one or more legs contact the mounting surface in an area surrounding the at least one heat producing electronic device. An upper surface of the table top either directly or indirectly contacts an inner surface of the heat dissipating portion of the casing.

14 Claims, 5 Drawing Sheets

(56)　　　　　References Cited

U.S. PATENT DOCUMENTS

| | | | |
|---|---|---|---|
| 2004/0014508 | A1 | 1/2004 | Seo et al. |
| 2008/0224257 | A1* | 9/2008 | Mori ................. H01L 21/76283 |
| | | | 361/709 |
| 2013/0000865 | A1* | 1/2013 | Shi ....................... G02B 6/4246 |
| | | | 165/185 |
| 2013/0182392 | A1* | 7/2013 | Yu .......................... H05K 9/002 |
| | | | 361/719 |
| 2014/0078677 | A1 | 3/2014 | Dolci et al. |
| 2015/0245533 | A1* | 8/2015 | Wright ................. H05K 1/0254 |
| | | | 361/679.31 |
| 2016/0128208 | A1* | 5/2016 | Bolik ................. H05K 7/20436 |
| | | | 361/709 |
| 2016/0246019 | A1 | 8/2016 | Ishii et al. |
| 2017/0071074 | A1* | 3/2017 | Matheson ............. G06F 1/1656 |
| 2020/0185290 | A1 | 6/2020 | Padmanabhan Ramalekshmi |
| | | | Thanu et al. |
| 2021/0072473 | A1* | 3/2021 | Wall, Jr. .................. H01L 23/42 |
| 2022/0221667 | A1* | 7/2022 | Yao ....................... G02B 6/4269 |
| 2022/0311517 | A1* | 9/2022 | Nielsen ................. H04B 10/25 |
| 2022/0317394 | A1* | 10/2022 | Huang ................... G02B 6/428 |
| 2022/0386503 | A1* | 12/2022 | Yeh ....................... H05K 1/0203 |
| 2024/0069296 | A1* | 2/2024 | Meadowcroft ...... G02B 6/4284 |
| 2024/0126028 | A1* | 4/2024 | Mousa ................. G02B 6/4246 |

* cited by examiner

ELECTRONIC MODULE, ESPECIALLY OPTICAL TRANSCEIVER MODULE

CROSS REFERENCE TO RELATED APPLICATION

This application claims priority to European Patent Application No. 22202434.1, filed Oct. 19, 2022, the disclosure of which is hereby incorporated by reference in its entirety.

BACKGROUND OF THE INVENTION

Field of the Invention

The invention relates to an electronic module, especially an optical transceiver module.

Description of Related Art

Electronic modules often comprise at least one electronic or optoelectronic device or component, e.g. a laser or laser driver, which produces heat that is to be dissipated in order to avoid deterioration of the electronic or optical properties of the device or even destruction.

In most cases, an electronic module comprises a casing consisting of a material that allows to dissipate heat generated within the casing, especially by an electronic device provided on a printed circuit board (PCB) provided within the casing.

It shall be noted that, in the following description, the term "electronic device" is used to designate any type of electronic or optoelectronic device or component irrespective of its type and functionality and the term "printed circuit board" is used to designate any plate-like carrier on which one or more electronic devices are provided, wherein the PCB is configured to carry and electrically contact the electronic devices with each other and/or with plug or socket contacts provided on the PCB or even one or more sub-PCBs comprised by and mounted on or connected to a main PCB (of the whole PCB).

SUMMARY OF THE INVENTION

It is generally known to dissipate the heat of an electronic device by mounting a heat dissipation means, e.g. a passive heat sink comprising ribs of fins and/or an active cooling device like an electric fan, to the PCB or directly to the electronic device in such a way that the electronic device is in thermal contact with a corresponding portion of the heat dissipation means. The casing may provide one or more openings in order to enable an air flow through the casing.

It is further known to establish a thermal contact between the electronic device, especially with an upper surface thereof (i.e. the facing away from the mounting surface of the PCB on which the electronic device is mounted), and the casing, i.e. an inner surface thereof, so that the casing, which is preferably made of a material having a high thermal conductivity, acts as a heat sink.

In cases in which it is impossible to dissipate the heat from an upper side of an electronic device, it is known to dissipate the heat via the PCB, e.g. by providing one or more thermal paths through the PCB from its mounting surface to its opposite side which may be in contact with the inner surface of the casing facing this side of the PCB.

Such cases may arise, for example, if the PCB carries a laser, especially a vertical-cavity surface emitting laser (VCSEL), a laser driver, a photo diode or a transimpedance amplifier (TIS), which is covered by a component made of material(s) that do not allow to dissipate heat to a sufficient extent. Such a component may be used to provide an optical path for the radiation created by the laser (including one or more reflective areas acting as mirrors) and/or providing means to fixedly position one or more optical fibers in such a way that the optical radiation is coupled into the optical fibers.

However, depending on the design of the electronic component, it may be difficult or even impossible to dissipate the heat from the portion of the casing that faces the PCB lower surface, especially if the module is designed as a plug-in or connector module which is configured to be plugged into a connector cage which does not allow to dissipate heat from the side of the module casing that faces, with its inner surface, the PCB.

It is thus an object of the present invention to provide an electronic module comprising a casing accommodating a PCB on a mounting surface on which at least one heat producing electronic device is mounted, wherein the module is able to dissipate heat from the side of the casing that faces the PCB mounting surface.

The invention starts from the finding that the PCB may be used in order to establish a thermal path from the mounting location of a heat producing electronic device, e.g. a VCSEL, a laser driver, a photo diode or a TIA, to a region surrounding the mounting location or the electronic device, respectively. From this region, the heat may be dissipated to the inner surface of the casing that faces the mounting surface of the PCB, i.e. the surface of the PCB on which the one or more electronic devices are mounted. For this purpose, a table-like heat dissipating element having one or more legs extending from a table top is provided on and thermally connected to the mounting surface. The table top covers the at least one heat producing electronic device and the legs contact the mounting surface in an area surrounding the at least one heat producing electronic device.

It is of course advantageous if the legs are positioned as close as possible to the at least one heat producing electronic device, i.e. as close as allowed by the design of the PCB and the whole electronic module, respectively. In this way, the length and thus the thermal resistance of the thermal path provided by the PCB can be minimized.

It is further desirable to provide at least one leg on opposite sides of the at least one heat producing electronic device in order to dissipate heat not only on one side.

Of course, the heat dissipating element is designed in such a way, including a suitable choice of the material (or material combination), that a sufficiently high thermal conductivity is obtained or, in other words, a sufficiently low thermal resistance is obtained between the regions of contact of the legs of the heat dissipating element and a respective heat dissipating portion of the casing, which serves to further dissipate the heat.

According to an embodiment of the invention, the heat dissipating element and/or the whole casing or the heat-dissipating portion thereof consist of a thermally conductive material having a thermal conductivity equal to or higher than aluminum, especially aluminum or copper.

It shall be noted here that the term "material" in this respect also covers combinations of different materials. It is be noted that the term "thermally conductive" material within this description shall mean that the material has a thermal conductivity sufficiently high in order to use the material for heat dissipation purposes so that, in combination with an appropriate design of a component that is used to realize a thermal path, a sufficiently low thermal resistance can be achieved.

In another embodiment, a heat transfer medium, especially a heat transfer sheet, may be provided between the upper surface of the table top and the inner surface of the heat dissipating portion of the casing.

The heat transfer medium may be realized by a preferably plastically or elastically deformable heat transfer sheet, having a sufficiently high thermal conductivity, preferably equal to or higher than aluminum.

According to another embodiment of the invention, the legs of the heat dissipating element directly or indirectly contact the printed circuit board in regions covered by a material layer that is used to realize the electric contacts of the printed circuit board. As electrically conductive materials have, in general, also a high thermal conductivity, this guarantees a low thermal resistance between the material layer and the respective leg, wherein, of course, a sufficiently close contact must be provided between the neighboring surfaces.

In order to achieve such a sufficiently close contact, a plastically or elastically deformable heat transfer medium may be provided between the legs of the heat dissipating element and the printed circuit board.

According to a further embodiment, the heat dissipating element has at least one hole that extends through the table top and a leg and the heat dissipating element is mounted to the printed circuit board by a screw that extends through the at least one hole. In this way, a quick and easy assembly of the heat dissipating element and thus of the electronic module is achieved.

Further, the heat dissipating element may comprise at least one extension portion that extends from the table top beyond the area surrounding the at least one heat producing electronic device in which the legs contact the mounting surface, wherein an upper surface of the at least one extension portion directly or indirectly contacts an inner surface of a heat dissipating portion of the casing. In this way, the heat to be dissipated can be guided further away from the location of the respective heat producing electronic device. This design makes it possible to dissipate the heat to the casing in an area corresponding to the total area defined by the table top and the extension portion(s).

According to another embodiment, the table top has a flat surface and the at least one extension portion has a flat surface that is preferably flush with the surface of the table top.

According to another embodiment, the casing may comprise a heat dissipating means at its outer side of the at least one heat dissipating portion that is contacted, at its inner surface, by the at least one heat dissipating element.

This heat dissipating means may be an integrated heat sink comprising fins at its outer side.

According to a further embodiment, the at least one heat producing electronic device may be a laser, preferably a vertical-cavity surface emitting laser, which is covered by an optical component adapted to provide an optical path for radiation created by the laser, the optical path being configured to guide the radiation to an optical fiber, the optical component consisting of a material having a thermal conductivity lower than the material of the at least one heat dissipating element, preferably by a factor of 10, more preferably by a factor of 100.

As mentioned above, the electronic module, especially its casing, may be configured to be inserted into a connector cage.

In such an embodiment, the casing and the connector cage may be designed in such a way that the at least one heat dissipating portion of the casing contacts, at its outer surface, an inner surface of the connector cage, wherein the at least one heat dissipating portion is positioned in such a way that the region of contact is in an area of the connector cage at which the connector cage comprises a heat dissipating means.

Further embodiments of the invention are apparent from the depending claims.

BRIEF DESCRIPTION OF THE DRAWINGS

In the following, the invention will be described in detail with reference to the drawings. In the drawings.

DESCRIPTION OF THE INVENTION

Figures 1, 2:
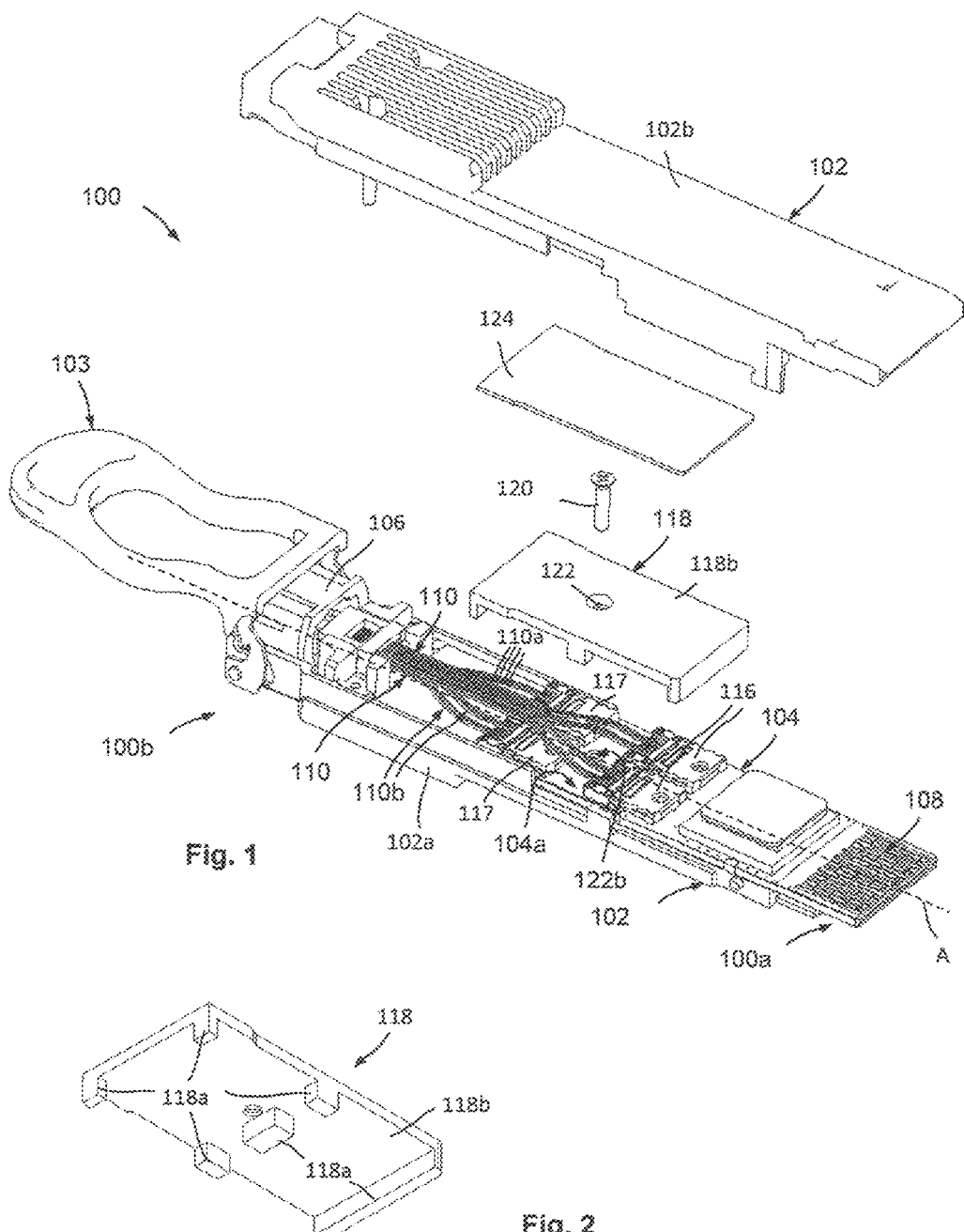
FIG. 1 shows a perspective exploded view of an electronic module according to a first embodiment that is realized as a connector module.
FIG. 2 shows a perspective view of the heat dissipating element comprised by the electronic module according to FIG. 1.

The exploded view according to FIG. 1 shows an electronic module 100 comprising a casing 102 consisting of a lower part 102a and an upper part 102b. The electronic module 100 and especially its casing 102 are realized as a connector type module that is configured to be inserted into a connector cage (not shown in the drawings). A handle 103 attached to the casing may be used to insert the electronic module 100, with its front side 100a first, into and to pull the electronic module 100 out of the connector cage. The electronic module 100 and the casing 102, respectively, may fulfill the small form factor pluggable (SFP) specification, including SFP, SFP+, OSFP, OSFPP-XD, QSFP and QSFP-DD, or the C form-factor pluggable (CFP) specification, including CFP, CFP2, CFP4 and CFP8.

The electronic module 102 further comprises a PCB 104 that is comprised within the casing 102. At its rear side 100b, the electronic module 100 comprises an optical connector 106 adapted to be connected to an external fiber connector (not shown). The optical connector 106 may be affixed to the rear part of the casing. In this way, multiple fibers can be connected to the electronic module 100.

The PCB 104 reveals, at its front side 100a, an electrical connector portion 108, which is configured to electrically contact the PCB 104 to a further external device (not shown) by plugging the electrical connector portion 108 into a respective connector cage, wherein the electrical connector portion 108 engages a complementary connector portion provided within the connector cage.

In the embodiment shown, the optical connector 106 is configured to connect two external optical fiber ribbons (not shown) each comprising 16 optical fibers to the electronic module 100. For this purpose, the electronic module 100 comprises two optical fiber ribbons 110 each comprising 16 optical fibers 110*a*, wherein each optical fiber 110*a* connects one of 16 ports of the optical connector 106 to a dedicated laser 112 or a dedicated photo diode 113 (see FIG. 3) mounted on the PCB 104 via four identical optical components 114. The corresponding eight lasers 112 are VSCELs creating radiation that is transmitted perpendicularly (away) from the (upper) surface of the PCB 104 which is referred to as mounting surface 104*a*. Likewise, the eight photo diodes 113 comprise a photo-sensitive area that extends parallel to the (upper) surface of the PCB 104, i.e. each photo diode 113 is configured to detect light that is directed in the direction perpendicular to the PCB surface. In this way, it is possible to use identical optical components to redirect the optical radiation from a respective optical fiber 110*a* to the respective photo diode 113 and to redirect the optical radiation created by a respective laser 112 to the respective optical fiber 110*a*.

As indicated in FIG. 1, each optical fiber ribbon 110 is split into four sub-ribbons 100*b*, each sub-ribbon 110*b* comprising four optical fibers 110*a*. Each sub-ribbon 110*b*, i.e. each of the respective four optical fibers 110*a* of a respective sub-ribbon 110*b*, is positioned with respect to the respective VCSELs 112 or photo diodes 113 by means of one of the four optical components 114. For this purpose, each optical component 114 may comprise four V-grooves in each of which one of the four optical fibers 110*a* is held, e.g. clamped by a common cover plate, which may also be glued to the main body of the optical component 114 (see FIG. 3). Each optical component 114 has a reflector surface 114*a*, which is configured to reflect the radiation created by the respective four VCSELs 112 to the respective dedicated optical fiber 110*a* or to reflect the radiation that is output by the optical fibers 110*a* to the respective photo diode 113.

As further apparent from FIG. 1, two laser drivers 116 are mounted on the PCB 104, wherein each of these laser drivers 116 is assigned to the respective four VCSELs the radiation of which is coupled into a selected one of the four optical fibers 110*a* of a sub-ribbon 110*b*. Further, two transimpedance amplifiers (TIA) 117 are mounted on the PCB 104, wherein each of these TIAs 117 is assigned to the respective four photo diodes 113, which detect the radiation from one of the four optical fibers 110*a* of a sub-ribbon 110*b*. Each of these groups of four VCSELs 112 and the respective dedicated laser driver 116 as well as each of these groups of four photo diodes 113 and the respective TIA 117 are covered by the respective optical component 114. This design guarantees that the radiation created by each VCSEL 112 of the respective group of four VCSELs is coupled into the dedicated optical fiber 110*a* (by redirecting the radiation by 90 degrees from its direction perpendicular to the PCB mounting surface 104*a* into a direction parallel to the PCB mounting surface 104*a* in which the fiber ends of the optical fibers 110*a* of the sub-ribbons 110*b* are held by the optical components 114) and that the respective laser driver 116 is positioned close to the dedicated VCSELs 112. Likewise, this design makes it possible to redirect the radiation from a respective one of the optical fibers 110*a* to a dedicated photo diode 113 as explained above.

However, this design leads to the disadvantage that the heat produced by the VCSELs 112 and the laser driver 116 cannot be directly dissipated to the upper part 102*b* of the casing 102 as the optical component has to consist of an optically transparent material in order to realize the desired optical functionality explained above and as practically all appropriate materials have a low thermal conductivity (i.e. a thermal conductivity that is not suitable to realize a thermal path for dissipating heat to the upper part 10*b* of the casing 102). As a result, in this design of an electronic component 100, the heat produced by the VCSELs 112 and the laser drivers 116 as well as by the photo diodes 113 and the TIAs 117 will mostly be transferred to the PCB 104.

In order to avoid deterioration or even destruction of the optical and electronic properties of the components mounted on the PCB 104 (and/or otherwise comprised within the casing 102 of the electronic module 100) it is thus necessary to dissipate the heat to the upper part 102*b* of the casing 102, especially if further heat dissipating means (such as heat sinks or fans) are provided on or are connected to the upper part 102*b* of the casing 102.

Usually, it is impossible to dissipate heat in a sufficient manner from the PCB 104 to the lower part 102*a* of the casing 102 (the bottom plate or the side walls thereof) and from the side walls of the lower part to the side walls and the upper lid of the upper part 102*b* as there is a rather high thermal resistance between the side walls of the lower part 102*a* and the side walls of the upper part 102*b*.

In order to, nevertheless, dissipate heat that is created by the VSELs 112, the photo diodes 113, the laser drivers 116 and the TIAs 117 to the upper part 102*b* of the casing 102, especially to the lid plate of the upper part 102*b*, a heat dissipating element 118 is provided on the mounting surface 104*a* of the PCB. In general, the heat dissipating element 118 has a table-like form comprising one or more legs 118*a* extending from a table top 118*b*, wherein the table top 118*b* covers the at least one heat producing electronic device. In the embodiment shown in FIGS. 1 to 3, the heat dissipating element 118 has six legs 118*a* which contact (with a bottom surface thereof) the mounting surface 104*a* of the PCB in an area surrounding the four groups of four VCSELs 112 and the laser drivers 116 and in an area between these heat producing components.

According to a further embodiment (FIG. 3), a heat transfer medium 119, e.g. a plastically or elastically deformable medium, may be provided between the mounting surface 104*a* of the PCB 104 and the lower surface of the legs 118*a* of the heat dissipating element 118. The heat transfer medium 119 may also be an adhesive that is used to mount the heat dissipating element 118 on the PCB 104.

As apparent from FIG. 1, the heat dissipating element 118 may be mounted to the PCB 104 by a screw 120 extending through a hole 122 in the heat dissipating element 118, especially extending through the tabletop 118*b* and a leg 118*a*. The screw 120 may engage a tapped hole 122*b* provided in the lower part 102*a* of the casing 102 or a nut mounted thereto. In this way, not only the heat dissipating element 118 is mounted to the PCB 104, but both elements are affixed to the lower casing part 102. Of course, instead of a single screw 120, two or more screws extending through two or more holes in the table top 118*b* and a respective leg 118*a* may be used.

In general, the number and the design, especially the length and the cross-section, of the legs 118*a* is designed in such a way that a sufficiently low thermal resistance of the legs between the respective surface contacting the mounting surface of the PCB 104 and the tabletop 118*b* is achieved. This thermal resistance must be low enough in order to dissipate a sufficient amount of heat from the respective contact area of the PCB 104 to the tabletop 118*b*. Further, the design, especially the surface and the thickness, of the tabletop 118*b* must be chosen in such a way that the thermal resistance between the upper ends of the legs 118*a* and the surface area of the inner wall of the upper casing part 102*b* is low enough in order to dissipate a sufficient amount of heat from the legs 118*a* to the upper casing part 102*b*.

Figure 3:
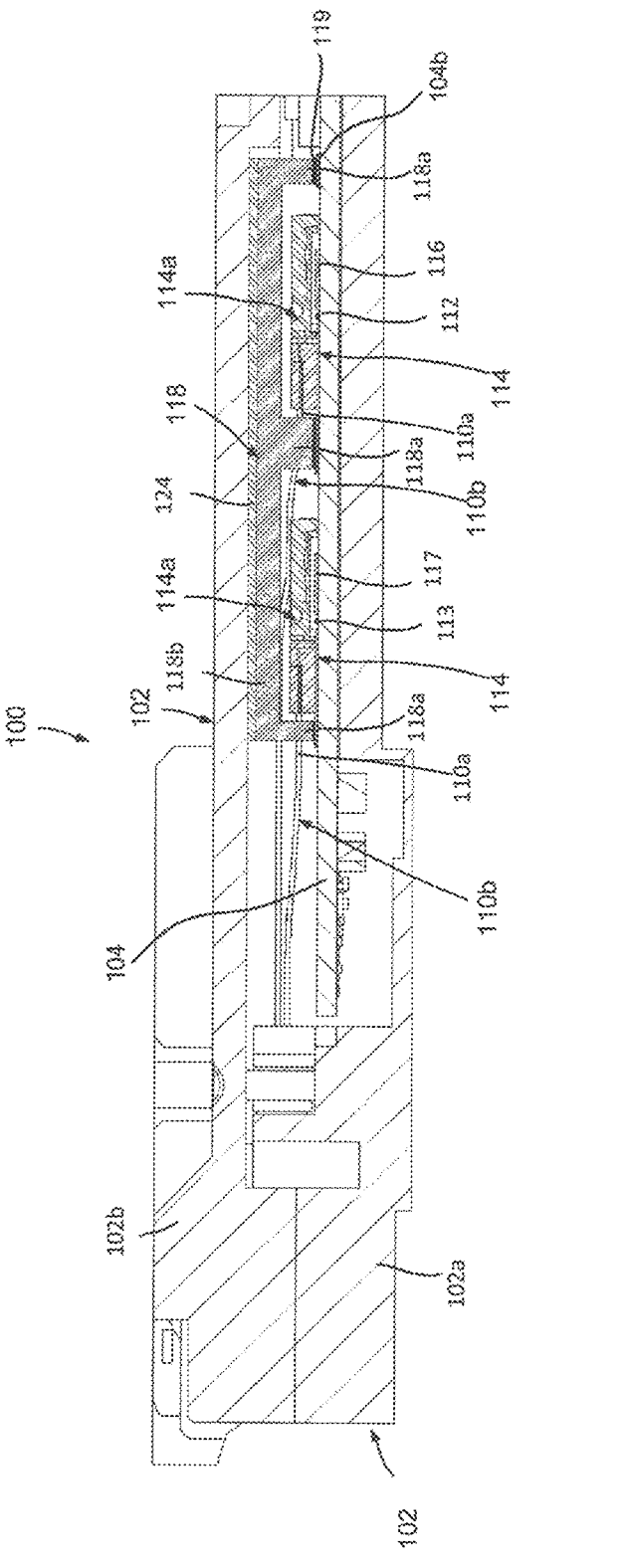
FIG. 3 shows a partial longitudinal section of the electronic module in FIG. 1.

As shown in FIG. 3, a heat transfer medium 124 may be provided between the upper surface of the table top 118*b* and the inner wall or in a surface of the upper casing part 102*b* facing the tabletop 118*b*. The heat transfer medium 124 may be realized as an elastically or plastically deformable sheet. Of course, the heat transfer medium 124 must have a sufficiently high thermal conductivity.

By using such a heat dissipating element 118, it is possible to dissipate a major part of the heat produced by the one or more heat dissipating devices, i.e. the VCSELs 112, the laser drivers 116, the photo diodes 113 and the TIAs 117, via the PCB 104 and the heat dissipating element 118 to the upper casing part 102*b*. Of course, a minor part of the heat may also be transferred from the PCB 104 and the lower casing part 102*a* to the upper casing part 102*b* via the side walls of both casing parts 102*a*, 102*b*. However, with a heat dissipating element 118 as described above, more than 80%, preferably more than 90% of the heat can be transferred to the upper casing part 102*b* via the heat dissipating element 118.

It shall be mentioned that, of course, also the position of the areas in which the legs 118*a* contact the PCB mounting surface 104 must be chosen appropriately. Preferably, the legs 118*a* are provided at positions sufficiently close to the location of a heat producing electronic device like a laser or laser driver. If only a single heat producing electronic device is mounted on the PCB 104, a heat dissipating element 118 having a single leg 118*a* may be used, wherein the leg 118*a* contacts the PCB mounting surface 104*a* at a location that guarantees that a sufficient amount of heat is dissipated via the PCB to the leg 118*a* (and, of course, from the leg 118*a* and the table top 118*b* to the upper casing part 102*b*). It might be preferred to provide two or more legs 118*a* at opposite sides of the heat producing electronic device or to provide two or more legs 118*a* in a region of the PCB mounting surface 104*a* surrounding the electronic device.

If two more heat producing electronic devices are mounted on the PCB 104, a single leg 118*a* may be provided at a position within the area in which the electronic devices are provided (i.e. within an area of the PCB mounting surface 104*a* that may be defined by a circle area in which all electronic devices are provided). If the heat transfer element 118 comprises two or more legs 118*a*, all legs may be provided within the area in which the electronic devices are provided and/or in a region directly neighboring this area. Of course, the locations of the legs 118*a* can be chosen in such a way that a sufficiently high portion of the heat produced by the electronic devices is dissipated to the upper casing part 102*b*. The table top 118*b* of the heat dissipating element 118 preferably fully covers the area, in which the heat dissipating elements are mounted on the PCB mounting surface 104*a*.

It shall be noted that, in a further embodiment (not shown), two or more heat dissipating elements 118 may be provided, each of which covers at least one heat producing electronic device mounted on the PCB.

The heat dissipating element 118 used in the embodiment shown in FIGS. 1 to 3 is designed in such a way that the table top 118*b*, in the direction of the longitudinal axis A of the electronic module 100, does not reach beyond the legs 118*a*.

FIG. 3 also shows that the legs 118*a* of the heat dissipating element 118 can contact PCB 104 via a material layer 104*b* that is used to realize electric contacts of the PCB 104. In order to achieve a close contact, a plastically or elastically deformable heat transfer medium 119 may additionally be provided between the legs 118*a* of the heat dissipating element 118 and the PCB 104.

Figure 4:
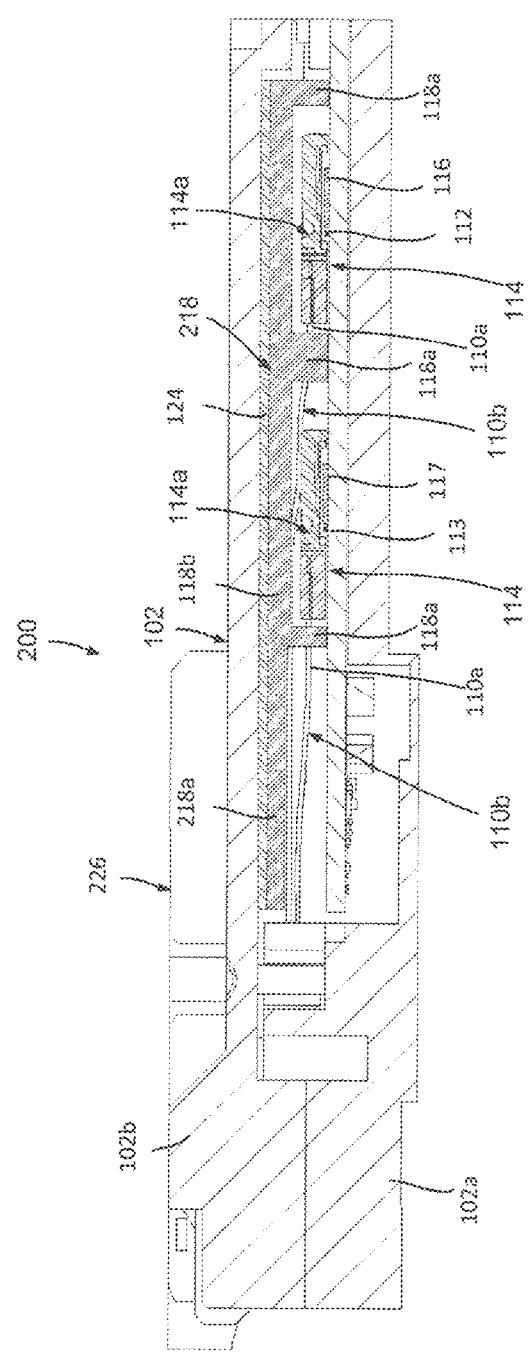
FIG. 4 shows a partial longitudinal section of an electronic module according to a second embodiment of an electronic module similar to FIG. 1 comprising a heat dissipating element having an extension portion.

FIG. 4 shows a partial longitudinal section of a further embodiment of an electronic module 100 which is essentially identical with the embodiment shown in FIGS. 1 to 3 explained above. This electronic module 200, however, differs from the module shown in FIGS. 1 to 3 in that a modified heat dissipating element 218 is used.

The heat dissipating element 218 differs from the heat dissipating element 118 in that it comprises an extension portion 218*a* that extends from the table top 118*b* in the direction of the longitudinal axes A to the end of the electronic module 200 at which the optical connector 106 is provided. The extension portion 218*a* extends in a region of the upper casing part 102*b* in which a passive heat sink 226 is provided at the outside of the upper casing part. In this way, the heat is dissipated to the heat sink 226 via the thermal path provided by the extension portion 218*a*. As apparent from FIG. 4, the upper surface of the flat table top 118*b* is flush with the upper surface of the flat extension portion 218*a*. Thus, the thermal contact between the table top 118*b* and the upper wall of the upper casing part 102*b* can be improved by a correspondingly enlarged heat transfer medium 124 which extends into the space between the upper surface of the extension portion 218*a* and the inner surface of the upper wall of the upper casing part 102*b*.

It is to be noted that, in both cases of the embodiments according to FIGS. 1 to 3 and 4, the front portion of the casing 102 may be inserted into a connector cage so that the outer surface of the casing 102, especially the upper outside surface of the upper casing part 102*b* is in contact with the connector cage which may comprise further heat dissipating means like heat sinks and/or fans and may thus act as heat dissipating device.

Figure 5:
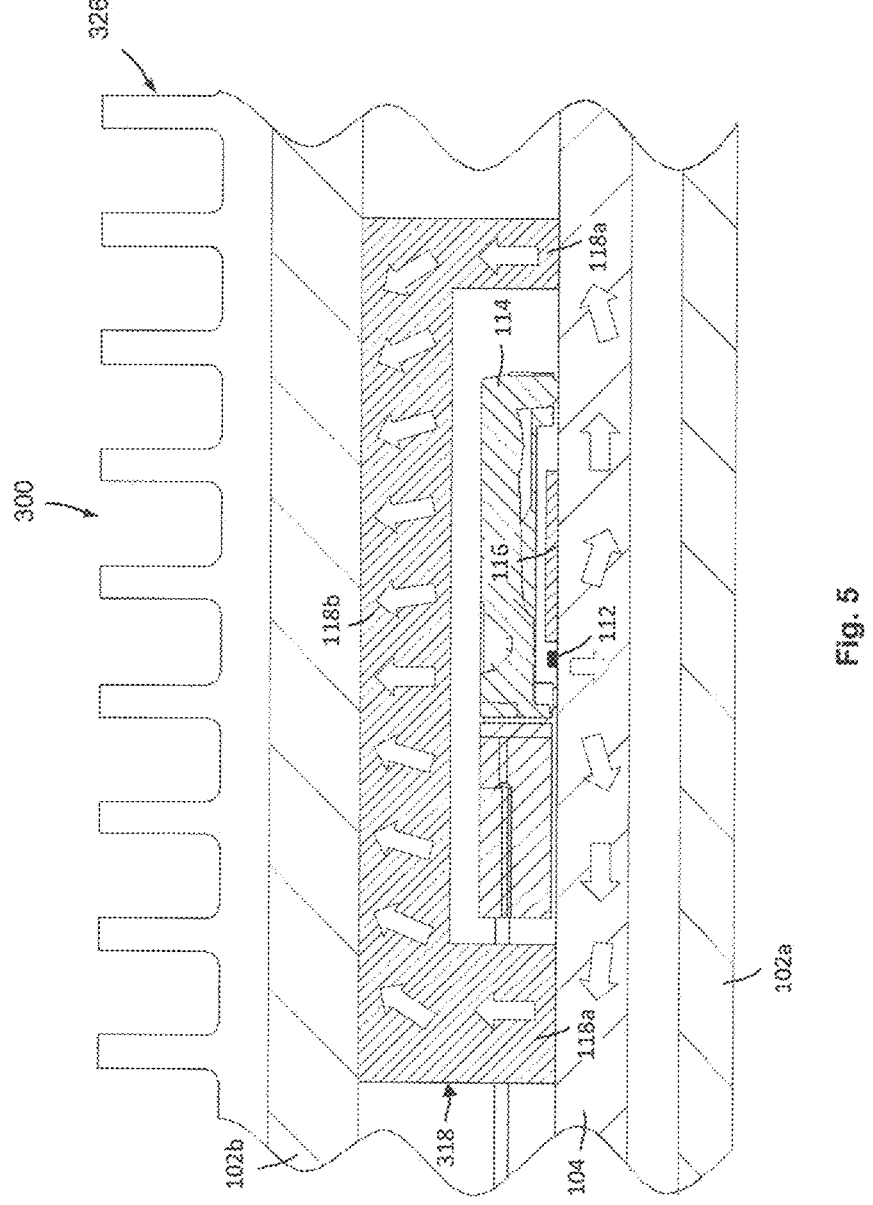
FIG. 5 shows a partial longitudinal section of an electronic module according to a third embodiment of an electronic module similar to FIG. 1, wherein arrows schematically indicate the thermal flow.

FIG. 5 shows a partial longitudinal section of an electronic module 300 similar to the embodiments shown in FIGS. 1 to 4. Thus, identical parts and components or parts and components having identical functionality are designated by identical reference numbers.

The embodiment according to FIG. 5 comprises a casing 102 consisting of a lower part 102*a* and an upper part 102*b*. A PCB 104 is provided within the casing 102 and affixed thereto in an appropriate manner. Two of the heat producing electronic devices comprised by the module 100, namely, a VCSEL 112 and a laser driver 116 mounted on the PCB 104, are shown in the partial longitudinal section according to FIG. 5. These heat producing electronic devices are covered by a heat dissipating element 318. The heat dissipating element 318 is essentially identical with the front portion of the heat dissipating element 118 shown in FIGS. 1 to 3 and has a single leg 118*a* at its front end (i.e. the end on the right side in FIG. 5 that faces the front portion of the casing at which the electrical PCB connector portion is provided) and two legs 118*a* at its rear end (i.e. the end on its left side in FIG. 5 that faces the portion of the casing in which the optical connector (not shown) is provided). Between the two rear legs 118*a*, the respective sub-ribbon 110*b* is guided to the mounting portion of the optical component 114.

The double arrows in FIG. 5 visualize the heat flow of the heat produced by the VCSEL 112 and the laser driver 116 via the PCB 104 and the heat dissipating element 318 to the top wall of the upper casing part 102*b*. The upper casing part 102*b*, in this embodiment, comprises or is connected to a heat sink 326.

Figure 6:
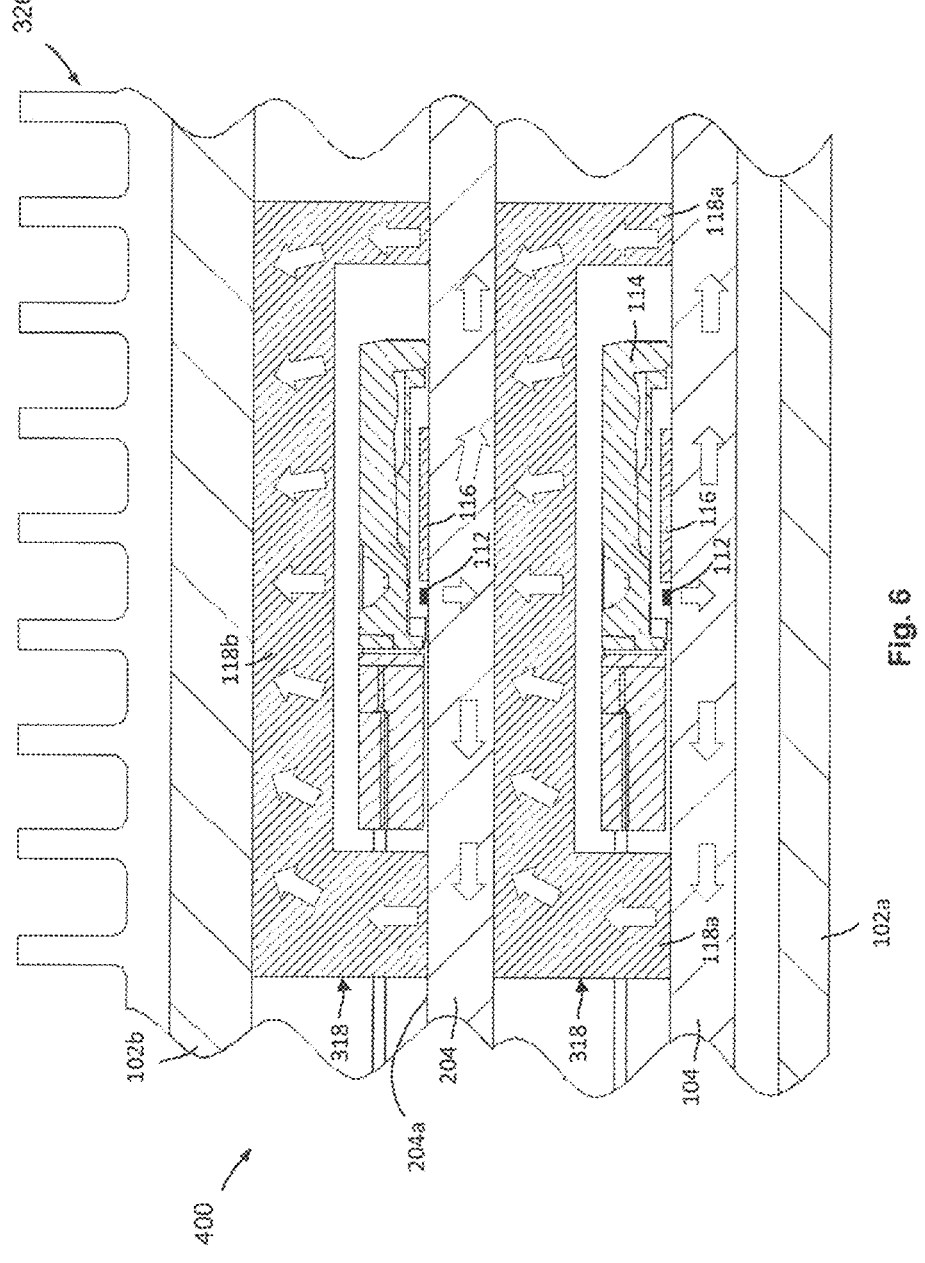
FIG. 6 shows a partial longitudinal section of an electronic module according to a fourth embodiment of an electronic module comprising stacked PCBs and heat dissipating elements, wherein arrows schematically indicate the thermal flow.

FIG. 6 shows a partial longitudinal section of an electronic module 400 having a similar design as the electronic modules 100, 200 and 300. Thus, identical parts and components or parts and components having identical functionality are designated by identical reference numbers. In general, the electronic module 400 reveals an identical design with respect to the casing 102.

The electronic module 400 differs from the electronic modules described above in that it comprises a further PCB 204 that is stacked onto the PCB 104. The PCB 204 may have a smaller size than the PCB 104 and may be referred to (independent of its size) as sub-PCB (or second PCB). In the example shown, the sub-PCB 204 reveals (at least in the portion shown in FIG. 6) an identical design as the PCB 204. It has a mounting surface 204a on which a corresponding number of VCSELs and laser drivers are mounted.

The sub-PCB 204 is, with its lower surface, in direct or indirect contact (e.g. by a heat transfer medium as described above) with the upper surface of the table top of the heat transfer element 318. In the embodiment shown in FIG. 6, the sub-PCB 204 reveals an identical design as the PCB 104 (at least in the region displayed) and is stacked on the PCB 104 in such a way that the heat producing electronic devices, i.e. the VCSELs 112 and the laser drivers 116, are at the same position with respect to the longitudinal axis of the electronic module 400. As is the case for the (main) PCB 104, a heat dissipating element 318 is provided on the sub-PCB 204 in such a way that the respective table top covers the heat producing elements. The upper surface of the table top of this heat dissipating element 318 is in direct or indirect contact (via a heat transfer medium as described above) with the inner surface of the upper wall of the upper casing part 102b.

The stacked configuration of the PCBs 104, 204 including the heat dissipating elements 318 may be fixated by any arbitrary appropriate means, e.g. by mounting the heat dissipating elements 318 on the PCB 104 and the sub-PCB 204, respectively, and mounting the sub-stack consisting of the heat dissipating element 318 and the sub-PCB 204 on the sub-stack consisting of the heat dissipating element 318 and the PCB 104 (e.g. using an adhesive or one or more screws), or by using one or more screws or any other mounting means that extends through both sub-stacks, wherein the screws engage a complementary thread provided in or on the PCB 104. The whole stack may further be mounted within the casing 102 by using further mounting means, e.g. by an adhesive or one or more screws.

It shall be noted that instead of only one sub-PCB a stacked configuration comprising two or more sub-PCBs may be used, wherein the PCB and the sub-PCBs form three or more "floors" (i.e. the ground floor is realized by the PCB 104 and the second and further floors are formed by the stacked sub-PCBs).

It is further noted that the heat dissipating elements 318 of the various floors of such a stacked configuration may be provided at different longitudinal positions (with respect to the longitudinal axis of the electronic module) and/or may have differing geometric designs. It is, however, advantageous if the legs of a heat dissipating element 318 in a floor above the ground floor are provided in an area of the respective PCB 204 that does not extend beyond the surface area of the top table (and, as the case may be, beyond the surface area of an extension portion) of the heat dissipating element in the floor underneath (i.e. if the legs extended through the respective PCB, they would be in contact with the surface of the underneath heat dissipating element).

The double arrows in FIG. 6 visualize the thermal flow from the heat dissipating devices, i.e. the VCSELs 112 and the laser drivers 116, to the upper casing part 102b, especially the upper wall thereof, which comprises or is connected to a heat sink 326. As apparent from FIG. 6, the heat is dissipated by thermal paths realized by the respective portions of the PCB 104 and the sub-PCB 204 and the heat dissipating elements 318.

It is noted that it is not necessary that the whole casing 102 is made of a thermally conductive material. Rather, it is sufficient to make a portion of the casing of a thermally conductive material (this portion shall in this description be designated as heat dissipating portion), so that this portion realizes the functionality of dissipating the heat to the surrounding air or to a neighboring heat sink.

As described above, the invention makes it possible to dissipate heat produced by heat producing electronic devices to the top of the casing (or the part of the casing that faces the mounting surface of a PCB provided within the casing) even if it is impossible to directly bring into contact the heat producing electronic devices with the respective portion of the casing.

LIST OF REFERENCE SIGNS

100 electronic module
100a front side
100b rear side
102 casing
102a lower part
102b upper part
103 handle
104 PCB
104a mounting surface
104b material layer
106 optical connector
108 electrical connector portion
110 optical fiber ribbon
110a optical fiber
110b sub-ribbon
112 laser (VCSEL)
113 photo diode
114 optical component
114a reflector surface
116 laser driver
117 transimpedance amplifier (TIA)
118 heat dissipating element
118a leg
118b table top
119 heat transfer medium
120 screw
122 hole
122b tapped hole
124 heat transfer medium
200 electronic module
204 sub-PCB
204a mounting surface
218 heat dissipating element
218a extension portion
226 heat sink
300 electronic module
318 heat dissipating element
326 heat sink
A longitudinal axis

The invention claimed is:

1. An electronic module, comprising (a) a casing, at least a portion (heat dissipating portion) of which consists of a thermally conductive material adapted to dissipate heat to a surrounding air or to a neighboring heat sink;

(b) a printed circuit board provided within the casing, the printed circuit board carrying at least one heat producing electronic device on a mounting surface thereof;

c) a table-like heat dissipating element having one or more legs extending from a table top is provided on the mounting surface, wherein the table top covers the at least one heat producing electronic device and wherein the one or more legs contact the mounting surface in an area surrounding the at least one heat producing electronic device, and (d) an upper surface of the table top either directly or indirectly contacts an inner surface of the heat dissipating portion of the casing, wherein the printed circuit board, the table-like heat dissipating element and the casing are designed in such a way that a major part of the heat produced by the at least one heat producing electronic device is dissipated via the printed circuit board and to the table top by way of the one or more legs of the table-like heat dissipating element to the heat dissipating portion of the casing.

2. The electronic module according to claim 1, wherein the table-like heat dissipating element and/or the whole casing or the heat-dissipating portion thereof consist of a thermally conductive material having a thermal conductivity equal to or higher than aluminum.

3. The electronic module according to claim 1, wherein a heat transfer medium is provided between the upper surface of the table top and the inner surface of the heat dissipating portion of the casing.

4. The electronic module according to claim 3, wherein the heat transfer medium is a plastically or elastically deformable heat transfer sheet.

5. The electronic module according to claim 1, wherein the one or more legs of the table-like heat dissipating element directly or indirectly contact the printed circuit board in regions covered by a material layer that is used to realize the electric contacts of the printed circuit board.

6. The electronic module according to claim 1, wherein a plastically or elastically deformable heat transfer medium is provided between the one or more legs of the table-like heat dissipating element and the printed circuit board.

7. The electronic module according to claim 1, wherein the table-like heat dissipating element has at least one hole that extends through the table top and a leg of the one or more legs and wherein the table-like heat dissipating element is mounted to the printed circuit board by a screw that extends through the at least one hole.

8. The electronic module according to claim 1, wherein the table-like heat dissipating element comprises at least one extension portion that extends from the table top beyond the area surrounding the at least one heat producing electronic device in which the one or more legs contact the mounting surface, and wherein an upper surface of the at least one extension portion directly or indirectly contacts the inner surface of the heat dissipating portion of the casing.

9. The electronic module according to claim 8, wherein the table top has a flat surface and that the at least one extension portion has a flat surface that is flush with the flat surface of the table top.

10. The electronic module according to claim 1, wherein the casing comprises a heat dissipating means at its outer side of the heat dissipating portion that is contacted, at its inner surface, by the table-like heat dissipating element.

11. The electronic module according to claim 10, wherein the heat dissipating means is the neighboring heat sink at the outer side.

12. The electronic module according to claim 1, wherein the at least one heat producing electronic device is a laser, which is covered by an optical component adapted to provide an optical path for radiation created by the laser, the optical path being configured to guide the radiation to an optical fiber, the optical component consisting of a material having a thermal conductivity lower than a material of the table-like heat dissipating element.

13. The electronic module according to claim 1, wherein the casing is configured to be inserted into a connector cage.

14. The electronic module according to claim 13, wherein the casing and the connector cage are designed in such a way that the heat dissipating portion of the casing contacts, at its outer surface, an inner surface of the connector cage, wherein the heat dissipating portion is positioned in such a way that a region of contact is in an area of the connector cage at which the connector cage comprises a heat dissipating means.

* * * * *